United States Patent Office 3,440,231
Patented Apr. 22, 1969

3,440,231
OXETANE COPOLYMERS
Daniel Edwin Maloney, Hockessin, Del., assignor to E. I.
du Pont de Nemours and Company, Wilmington, Del.,
a corporation of Delaware
No Drawing. Filed Jan. 19, 1967, Ser. No. 610,250
Int. Cl. C08f *19/00;* B32b *27/06, 27/28*
U.S. Cl. 260—80.8                6 Claims

ABSTRACT OF THE DISCLOSURE

Reaction products of amino or hydroxy oxetane with acyl halide-alpha olefine copolymers and their use in coating organic substrates.

---

This invention relates to copolymers containing polymerized units having the formula

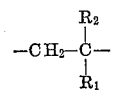

where $R_1$ is a radical selected from the class consisting of hydrogen, halogen, and hydrocarbon radicals having 1 to 8 carbon atoms, and $R_2$ is a radical selected from the class consisting of hydrogen, halogen, and methyl radicals; and polymerized alpha, beta ethylenically unsaturated carboxylic acid units that have been modified to contain an oxetane ring radical. This invention also relates to methods of producing such copolymers, and to composite structures that result from the reaction of the oxetane ring radical and another organic group on a substrate.

It is known in the art to produce copolymers having units of the formula

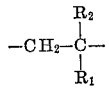

and units obtained by polymerization of an alpha, beta ethylenically unsaturated carboxylic acid. The present invention is concerned with the modification of copolymers of this type.

The unmodified copolymers employed in the present invention as starting materials are preferably random high molecular weight copolymers. The melt index of the alpha-olefin copolymers is within the range of 0.1 to 1000 g./10 minutes and preferably within the range of 1.0 to 200 g./10 minutes as measured by ASTM D-1238-57T. The copolymers must contain at least 50 mole percent units having the formula

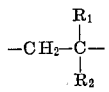

where $R_1$ is a radical selected from the class consisting of hydrogen, halogen and hydrocarbon radicals having 1 to 8 carbon atoms, and $R_2$ is a radical selected from the class consisting of hydrogen, halide, and methyl; preferably, at least 80 mole percent of the units are of this type. Specific units useful in the copolymers are those derived on polymerization of ethylene, propylene, butene-1, styrene, pentene-1, hexene-1, heptene-1, 3 methylbutene-1, 4 methylpentene-1, vinyl halide, and vinylidene halide. The copolymers must contain between .1 and 25 mole percent acid chloride units, preferably .2 to 10 mole percent. These units are derived from the polymerization of alpha, beta ethylenically unsaturated carboxylic acids having 3 to 8 carbon atoms followed by reaction with a chlorinating agent to convert the acid group to the acyl chloride. Specific acids that are useful in the copolymers include acrylic, methacrylic, ethacrylic, itaconic, maleic, fumaric, monoesters of dicarboxylic acid, such as ethyl hydrogen fumarate and maleic anhydride.

The preferred process for preparing the ethylene copolymers for use in the process of the present invention is direct copolymerization. This may be achieved by introducing the monomers into a polymerization environment maintained at high pressures, 50 to 3000 atmospheres, and at elevated temperature, 150 to 300° C., together with a free radical polymerization catalyst. An inert solvent such as benzene may be employed in the polymerization environment. Random distribution of carboxylic acid groups in all the polymer molecules is best obtained by direct copolymerization. A suitable process for the production of the random ethylene/acid copolymers is described in Canadian Patent No. 655,298, issued Jan. 1, 1963.

The copolymer need not necessarily comprise a two component polymer. More than one monomer having the formula

may be employed, and more than one alpha, beta ethylenically unsaturated acid may be employed. Additionally, other inert copolymerizable monomers can be employed in the copolymer. The term "inert" is used to define monomers which do not react with the acid chloride. The scope of copolymers suitable for conversion to acyl chloride copolymers is illustrated by the following examples:

Ethylene/acrylic acid copolyemrs, ethylene/methacryl-acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/methacrylic acid/methyl methacrylate copolymers, ethylene/propylene/acrylic acid copolymers, ethylene/styrene/acrylic acid copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

The unmodified copolymer is reacted with a chlorinating agent such as phosphorus pentachloride. A suitable process is by forming a slurry of the acid copolymer in a halogenated solvent such as carbon tetrachloride to which is added the chlorinating agent. After heating with agitation, complete conversion of the acid OH groups to acyl chloride groups is obtained. This process is more fully described in U.S. patent application Ser. No. 254,-567. The resulting acyl chloride copolymer is then reacted with amino-oxetane compounds having the formulas

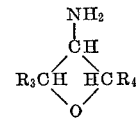

where $R_3$ and $R_4$ are hydrogen or alkyl groups having 1 to 6 carbon atoms, to form an N-acyl amino oxetane containing unit in the copolymer. It is preferable to have an acid acceptor present during this reaction. Any of the usual acid acceptors such as pyridines, tertiary amines, etc. which do not react with acid chlorides are satisfactory. Hydroxy oxethanes such as

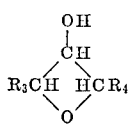

may also be used in this reaction, the subsequent product formed being the corresponding oxetane ester. The reactions are exemplified by the following equations:

(1) 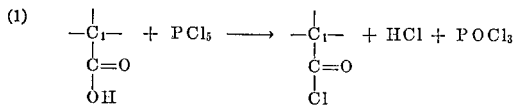

(2) 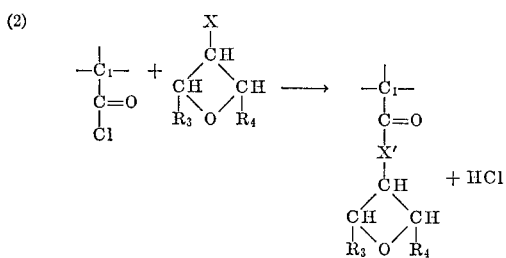

where $C_1$ is a carbon atom in the main copolymer chain, P is phosphorus, X is —OH or —$NH_2$ and X' is —O— or $$-\underset{H}{N}-$$

The copolymer containing the oxetane ring is normally stable but in the presence of a Lewis acid the heterocyclic ring opens as the oxygen atom, yielding sites for attachment of other compounds. In particular, the heterocyclic ring opening may be used for attachment to compounds containing hydroxyl groups, amine groups, amide groups and carboxyl groups. This reaction may be exemplified as follows:

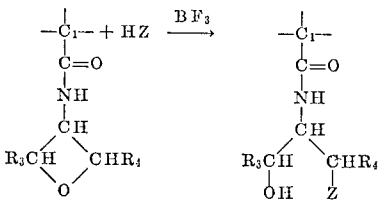

where $C_1$, $R_3$ and $R_4$ are as previously defined and HZ is a radical selected from the class consisting of

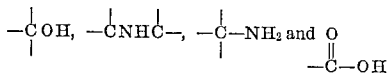

The Z portion of the radical that has reacted is covalently bonded through an atom selected from the class consisting of nitrogen and oxygen to one of the carbon atoms previously attached to the oxygen in the oxetane ring.

Specific oxetane compounds useful in reacting with the acyl halide group containing copolymers to produce the modified copolymers of the present invention are 3-amino oxetane and 3-hydroxy oxetane.

The reaction of the oxetane compounds with the acid chloride copolymers is most readily carried out by dissolving the copolymer in a hydrocarbon solvent such as toluene, benzene, carbon tetrachloride, perchloroethylene, trichloroethylene, cyclohexane, methylene chloride, and the like. To speed the dissolving process the solution may be heated mildly. The oxetane compound is then added to the dissolved acid chloride group containing copolymer; preferably the oxetane compound is dissolved in a similar hydrocarbon type solvent prior to adding it to the solution of the copolymer. The amount of oxetane compound added to the copolymer to obtain complete conversion of the acid chloride groups to ester or amide derivatives must be at least stoichiometrically equivalent to the number of acyl halide groups, and preferably, in order to obtain complete conversion rapidly, a large excess (2 to 10 times the stoichiometric amount) is added. The mixture of solvent, copolymer and oxetane compound is then preferably mildly heated (50° C. to about 85° C.) until the desired degree of conversion is obtained. The length of time required to obtain the desired degree of conversion will depend on the temperature of the solutions, the concentration of the oxetane compound, the concentration of the copolymer in the solvent, and other variables, but in general, the conversion will be complete in less than 16 hours.

The oxetane group containing copolymer is then removed from the solvent by evaporation of the solvent, or preferably by precipitation of the copolymer by the addition of a nonsolvent such as acetone, methylalcohol, dioxane, ethyl alcohol, methyl ethyl ketone, etc. The copolymer is then preferably washed with a nonsolvent to remove any impurities such as unreacted oxetane compound.

The resulting copolymers are useful to react with various organic substrate materials to form coatings. Thus, the copolymer may be applied to organic materials having amine, amide, hydroxyl or carboxyl groups, such as nylon, wool, cotton, and Dacron (a polyester made from methyl terephthalate and ethylene glycol). Such coatings decrease the tendency of protinaceous and cellulosic materials to shrink. The copolymers of this invention are particularly valuable as coating materials because they can be applied either as an aqueous dispersion, or as a solution in the hydrocarbon solvents.

The oxetane ring opens most readily and the copolymer reacts most readily with the organic material when the reaction media contains catalytic amounts of molecules or ions capable of coordinating with unshared electron pairs—i.e. that the reaction media contain "acid" as the term is used in the Lewis acid definition. Such "acids" include boron trifluoride, aluminum trichloride, tin tetrachloride, and phosphorous pentafluoride. The preferred range of concentration of the "acid" catalyst is 0.001 to 0.5% by weight of the reaction medium exclusive of the copolymer and the organic substrate.

The reaction between the modified copolymer and the organic materials can best be accomplished by forming a dispersion or a solution of the copolymer in a suitable liquid. The liquid may be an organic solvent, such as carbon tetrachloride in which case a solution of the copolymer in an organic solvent will result. In the preferred embodiment, the organic material to be coated with the copolymer is first treated with an "acid" compound, so that small amounts of "acid" are present on the surface to catalyze the opening of the oxetane ring.

In the following examples which illustrate the invention, all parts and percentages are in parts by weight unless otherwise noted.

EXAMPLE I

Preparation of ethylene/N-methacrylyl 3-amino oxetane copolymer

Ten grams of a random ethylene-methacrylyl chloride copolymer prepared by reacting a chlorinating agent with the ethylene-methacrylic acid copolymer product obtained by the process of Canadian Patent No. 655,298, having a weight ratio of ethylene to methacrylyl chloride of 90 to 10, and a melt index of about 5 grams/minute, was dissolved in 450 cc. of dry toluene at 70° C. 3.0 cc. of triethylamine was added followed by 3.0 grams of 3-amino oxetane. The solution was maintained at 70° C. for thirty minutes and then added to a large volume of acetone. The precipitate was collected, washed with acetone and dried. Infrared examination of a film pressed from the dried product showed absorption of $2.54\mu$ indicating the presence of the NH group, absorption at 6.05µ indicating the presence of the amide carbonyl group, absorption at 6.6µ further indicating NH group, absorption at 10.2µ and 11.4µ indicating the —C—O—C— structure which is characteristic of the oxetane ring.

Application of the copolymer to organic material

A 2% solution of the above copolymer in perchloroethylene was padded onto 8-inch squares of cotton poplin which had been pretreated with an aqueous solution containing 0.5% by weight of $Zn(BF_4)_2$. The amount of $nZ(BF_4)_2$ was between 0.01 and 0.09% by weight of the cotton. The cotton poplin was then heated at 125° C. for 30 minutes in a hot air oven. The cotton poplin was weighed and then heated in toluene under reflux at 110° C. for 4 hours, rinsed with fresh toluene, and reweighed. It was then heated again in toluene for 4 hours, rinsed in fresh toluene and reweighed. The results are:

Original amount of copolymer on cotton (% on weight of fabric) _____ 2.02
Copolymer remaining on cotton after 4 hours in toluene (% on weight of fabric) _____ 0.88
Percent copolymer remaining on cotton after 8 hours in toluene _____ 0.82

EXAMPLE II

Ten grams of a random ethylene-methacrylyl chloride copolymer prepared as described in Example I having a weight ratio of ethylene to methacrylyl chloride of 92.5 to 7.5 and a melt index of about 50 grams/10 minutes was dissolved in 400 cc. dry toluene. Five grams of 3-hydroxy oxetane was added and the solution maintained at reflux for two hours. The polymer was precipitated with a large volume of acetone, washed with acetone, and dried. Infrared examination showed absorption at 2.9µ indicating hydroxyl group, sharp absorption at 5.72µ indicating presence of ester carbonyl group, and absorption at 10.2 and 11.4µ indicating the presence of the oxetane ringe structure.

EXAMPLE III

Ten grams of an ethylene-ethyl acrylate-acrylyl chloride terpolymer, prepared by reacting a chlorinating agent with an ethylene-ethyl acrylate-acrylic acid terpolymer containing 6 weight percent acrylic acid and 20 weight percent of ethyl acrylate, was dissolved in 450 cc. of dry toluene at 70° C. 2.0 cc. triethyl amine was added followed by 3.0 grams of 3-amino oxetane. The solution was heated at 70° C. for ½ hour and then added to five volumes of acetone. The precipitate was collected, washed with acetone and dried. Infrared evidence established the presence of the amide group and the oxetane ring.

EXAMPLE IV

A 2% solution of the copolymer prepared in Example I in perchloroethylene was padded onto 8 inch squares of cotton poplin. The poplin was then treated with $PF_5$ by introducing the gas into a vessel containing the treated poplin for 15 minutes. After purging the vessel with nitrogen the samples were heated at 125° for 30 minutes in an oven. The cotton was then removed and repeated extraction failed to remove the polymer from the cloth.

EXAMPLE V 20 grams of a random ethylene/methacrylyl chloride copolymer prepared by reacting a chlorinating agent with the ethylene/methacrylate acid copolymer product obtained by the process of Canadian Patent No. 655,298, having a weight ratio of ethylene to methacrylic acid of 88 to 12 was dissolved in 400 cc. of dry toluene and 5.0 cc. triethylamine was added followed by 2.0 grams of 3-amino oxetane. The solution was heated for ½ hour at 70° C. and then precipitated by adding the toluene solution to a large volume of acetone. The polymer was washed twice and dried. Infrared examination of a film of the copolymer indicated the presence of the amide and oxetane groups.

The copolymer was molded into a film 16 mils thick and this film was exposed in the Atlas "Weather-Ometer" for 2500 hours. The film was still flexible after exposure. A comparable film of the ethylene/methacrylic acid copolymer used to prepare the oxetane coplymer was brittle and failed in less than 500 hours.

EXAMPLE VI

Seventeen grams of the ethylene/methacrylyl chloride copolymer described in Example I was dissolved in 400 cc. of toluene. Five cc. of triethyl amine and 1.4 grams of 3-amino oxetane was added and the solution heated at 70° C. for 30 minutes. The polymer was precipitated by adding the solution to a large volume of acetone containing 5% water. The polymer was washed with acetone and dried.

Cotton poplin was treated by padding with a 0.5% by weight of $Zn(BF_4)_2$ solution. The cloth was dried at 50° C. in a vacuum oven. The treated cotton was then padded with a 2% by weight solution of the above polymer dissolved in perchloroethylene. The treated samples were then cured at 125° C. for 30 minutes. These samples along with an untreated control were extracted for 4 hours in refluxing toluene, washed in fresh toluene and dried. The samples were then equilibrated and reweighed.

The treated sample and the control were tested for abrasion resistance using a Stoll surface abrader. Air pressure used was 5 p.s.i. and one pound was used on the pressure plate. The results are shown below:

| Sample | Original Percent copolymer on weight of fabric | After 4 hours extraction percent copolymer on weight of fabric | Abrasion resistance cycles to failure |
| --- | --- | --- | --- |
| Untreated control | | | [1] 543 |
| 1 | 2.3 | 1.3 | [1] 694 |

[1] Average of five specimens.

Although the copolymers of this invention are primarily useful as coating compositions for various organic substrates, the copolymers may also be used as films, molding powders, fibers and the like. Various stabilizing additives may be added to these compounds to improve their resistance to heat, light, and oxidation.

I claim:

1. A copolymer containing polymerized alpha-olefin units having the formula

where $R_1$ is selected from the class consisting of hydrogen, halogen and hydrocarbon radicals having 1 to 8 carbon atoms, and $R_2$ is selected from the class consisting of hydrogen, halogen and methyl radicals, said alpha-olefin units being present in the copolymer to the extent of at least 50 mole percent, and at least 0.2 mole percent polymerized units containing the radical having the formula

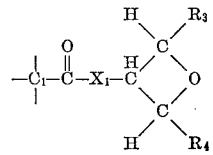

where $C_1$ is a carbon atom in the main copolymer chain, and $R_3$ and $R_4$ are selected from the class consisting of hydrogen and hydrocarbon groups having 1 to 6 carbon atoms and $X'$ is selected from the class consisting of the divalent oxygen radical and the divalent nitrogen radical having one attached hydrogen atom.

2. A process which comprises reacting a copolymer containing at least 50 mole percent polymerized alpha-olefin units having the formula

where $R_1$ is selected from the class consisting of hydrogen, halogen and hydrocarbon having 1 to 8 carbon atoms and $R_2$ is selected from the class consisting of hydrogen, halogen and methyl radicals, and at least 0.2 mole percent polymerized alpha, beta ethylenically unsaturated carboxylic acyl halide units having 3 to 8 carbon atoms, with a compound having the formula

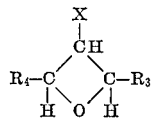

where $R_3$ and $R_4$ are selected from the class consisting of hydrogen and hydrocarbon groups having 1 to 6 carbon atoms, and X is either a hydroxyl or amino radical thereby forming polymeric units containing radicals having the formula

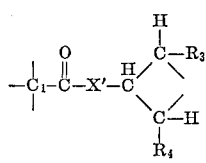

where X' is selected from the class consisting of the divalent oxygen radical and the divalent nitrogen radical having one attached hydrogen atom.

3. The process of claim 2 in which the reaction takes place in a hydrocarbon solvent for the copolymer, and in which the amount of compound added is at least stoichiometrically equivalent to the number of acyl halide units.

4. A composite which comprises an organic substrate material containing Z— groups, where Z— is selected from the class consisting of hydroxyl groups, amine groups, amide groups, and carboxyl groups, and a coating on said substrate material of a copolymer containing at least 0.2 mole percent based on the total number of moles of units in the copolymer, units having radicals having the formula

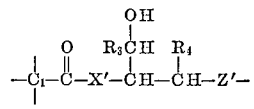

where $C_1$ is a carbon atom in the main copolymer chain, $R_3$ and $R_4$ are selected from the class consisting of hydrogen and hydrocarbon groups having 1 to 6 carbon atoms, Z' is a divalent radical derived from a Z— group and contains one less hydrogen atom than the Z— group, and X' is selected from the class consisting of the divalent oxygen radical and the divalent nitrogen radical having one attached hydrogen atom.

5. A process for producing the composite of claim 4 which comprises reacting a copolymer containing alpha-olefin units and units containing radicals having the formula

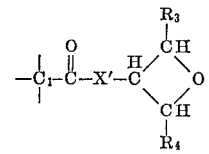

where $C_1$ is a carbon atom in the main copolymer chain, $R_3$ and $R_4$ are selected from the class consisting of hydrogen and hydrocarbon radicals having 1 to 6 carbon atoms and X' is selected from the group consisting of the divalent oxygen radical and the divalent nitrogen radical having one attached hydrogen atom, with an organic substrate containing groups selected from the class consisting of hydroxyl, amine, amide, and carboxyl groups.

6. The process of claim 5 in which the reaction takes place in the presence of a catalytic amount of material capable of coordinating with unshared electron pairs.

References Cited

UNITED STATES PATENTS 2,924,607   2/1960   Pattison _____ 260—333
3,341,475   9/1967   Vandenberg _____ 260—2

JOSEPH L. SCHOFER, *Primary Examiner.*

STANFORD M. LEVIN, *Assistant Examiner.*

U.S. Cl. X.R.

117—138.8, 139.5, 88.1, 87.7, 87.5, 78.5; 260—80.72

PO-1050
(5/69)

UNITED STATES PATENT OFFICE
CERTIFICATE OF CORRECTION

Patent No. 3,440,231   Dated April 22, 1969

Inventor(s)   DANIEL EDWIN MALONEY

It is certified that error appears in the above-identified patent and that said Letters Patent are hereby corrected as shown below:

Column 7, Claim 2, O is omitted from the formula., across from $\begin{smallmatrix}H\\C\end{smallmatrix}$ .

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents